(12) United States Patent
Khanna et al.

(10) Patent No.: US 11,399,414 B2
(45) Date of Patent: Jul. 26, 2022

(54) MOBILE BASE STATION BUBBLE NETWORK

(71) Applicant: Parallel Wireless, Inc., Nashua, NH (US)

(72) Inventors: Rajesh Khanna, Auburndale, MA (US); Patrick McPhee, Ashby, MA (US); Gaurav Kumar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/843,873

(22) Filed: Apr. 8, 2020

(65) Prior Publication Data

US 2020/0323037 A1    Oct. 8, 2020

Related U.S. Application Data

(60) Provisional application No. 62/831,141, filed on Apr. 8, 2019.

(51) Int. Cl.
| | |
|---|---|
| *H04W 88/16* | (2009.01) |
| *H04W 84/04* | (2009.01) |
| *H04W 36/14* | (2009.01) |
| *H04W 76/12* | (2018.01) |
| *H04W 88/08* | (2009.01) |

(52) U.S. Cl.
CPC .......... *H04W 88/16* (2013.01); *H04W 36/14* (2013.01); *H04W 76/12* (2018.02); *H04W 84/045* (2013.01); *H04W 88/08* (2013.01)

(58) Field of Classification Search
CPC ... H04W 88/16; H04W 84/045; H04W 36/14; H04W 76/12; H04W 88/08; H04W 36/305; H04W 84/105; H04W 36/125; H04L 12/66
See application file for complete search history.

(56) References Cited

U.S. PATENT DOCUMENTS

| | | | |
|---|---|---|---|
| 2015/0098452 A1* | 4/2015 | Dalsgaard | H04J 3/16 |
| | | | 370/336 |
| 2015/0312824 A1 | 10/2015 | Thalanany et al. | |
| 2016/0278097 A1* | 9/2016 | Ueda | H04W 72/0486 |
| 2017/0127368 A1* | 5/2017 | Wang | H04L 7/0008 |
| 2018/0139654 A1* | 5/2018 | Takano | H04W 76/10 |

* cited by examiner

*Primary Examiner* — Marcos L Torres
(74) *Attorney, Agent, or Firm* — Michael Y. Saji; David W. Rouille (57) ABSTRACT

Systems, methods and computer software are disclosed for providing a bubble network are described. In one embodiment, a method is disclosed including providing an isolated base station having a coverage area, providing a local HetNet Gateway (HNG) disposed within the coverage area and in communication with the isolated base station, providing a local Evolved Packet Core (EPC) in communication with the local HNG and disposed within the coverage area, and wherein the bubble network is disconnected from a mobile operator core network.

12 Claims, 8 Drawing Sheets

Prior Art

MOBILE BASE STATION BUBBLE NETWORK

CROSS-REFERENCE TO RELATED APPLICATIONS

This application claims priority under 35 U.S.C. § 119(e) to U.S. Provisional Pat. App. No. 62/831,141, filed Apr. 8, 2019, titled "Mobile Base Station Bubble Network" which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017. This document also hereby incorporates by reference U.S. Pat. Nos. 9,107,092, 8,867, 418, and 9,232,547 in their entirety. This document also hereby incorporates by reference U.S. patent application Ser. No. 14/822,839, U.S. patent application Ser. No. 15/828, 427, U.S. Pat. App. Pub. Nos. US20170273134A1, US20170127409A1 in their entirety.

BACKGROUND

The inventors have come up with an implementation of a bubble network, which is a network that provides core network services to users but is not connected (or only intermittently or partially connected) to the public Internet or to a mobile operator core network. A bubble network is necessary when a base station is operating independently to provide coverage to a small group of localized users, as is described in certain applications referenced herein, or in any situation where a base station does not have connectivity to its core network. A bubble network may provide services to users that it is directly serving, or users that it is connected to via a mesh network, while it is disconnected from the mobile operator core network, for example providing voice services to such users.

SUMMARY

Systems and methods for providing a bubble network are described. In one embodiment, a method may be disclosed for providing a mobile base station bubble network. The method may include providing an isolated base station having a coverage area, providing a local HetNet Gateway (HNG) disposed within the coverage area and in communication with the isolated base station, providing a local Evolved Packet Core (EPC) in communication with the local HNG and disposed within the coverage area, and wherein the bubble network is disconnected from a mobile operator core network.

In another embodiment, a non-transitory computer-readable medium containing instructions for providing a bubble network is disclosed. The instructions, when executed, cause a system to perform steps including providing an isolated base station having a coverage area, providing a local HetNet Gateway (HNG) disposed within the coverage area and in communication with the isolated base station, providing a local Evolved Packet Core (EPC) in communication with the local HNG and disposed within the coverage area, and wherein the bubble network is disconnected from a mobile operator core network.

In another embodiment, a bubble network system may be disclosed. The system includes an isolated base station having a coverage area, a local HetNet Gateway (HNG) disposed within the coverage area and in communication with the isolated base station, a local Evolved Packet Core (EPC) in communication with the local HNG and disposed within the coverage area and wherein the bubble network is disconnected from a mobile operator core network.

DETAILED DESCRIPTION

In the present disclosure, a bubble network is supported by the use of a local core network. The local core network is located in physical proximity to the base station and has conductivity to the base station, either physically or by wireless connection e.g., WiGig or Wi-Fi or Wi-Fi mesh.

Figure 1:
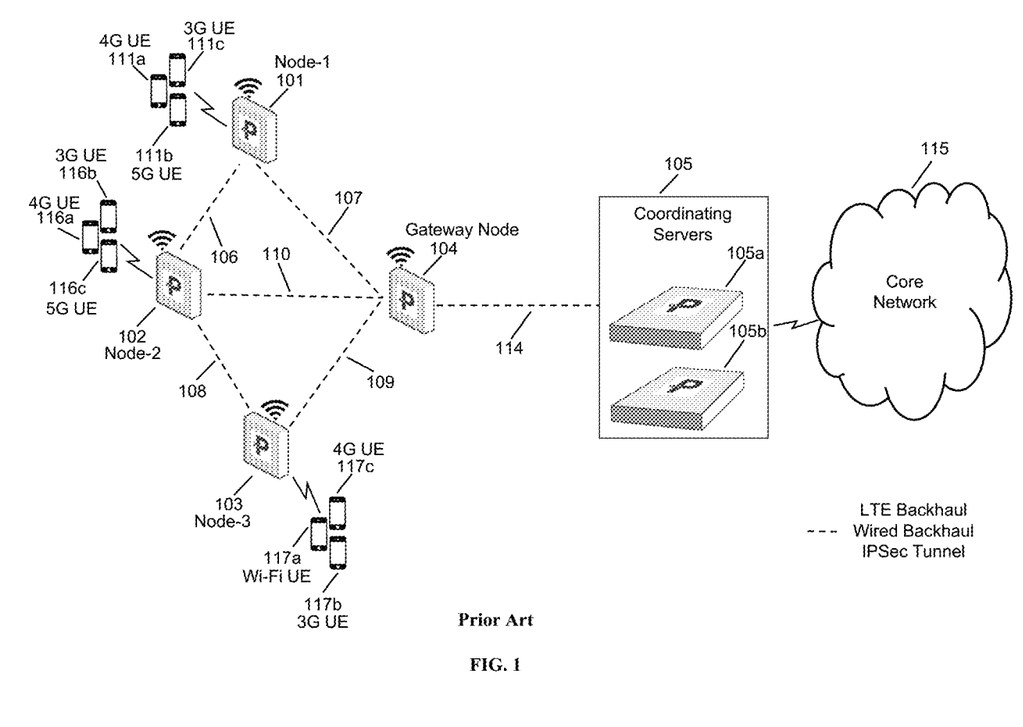
FIG. 1 is a prior art network diagram.

FIG. 1 is a prior art network diagram. As shown in FIG. 1, a mesh node 1 101, a mesh node 2 102, and a mesh node 3 103 are multi-radio access technology (multi-RAT) base stations. Base stations 101, 102, and 103 form a mesh network establishing mesh network links 106, 107, 108, 109, and 110 with a base station 104. The mesh network links are flexible and are used by the mesh nodes to route traffic around congestion within the mesh network as needed. The base station 104 acts as gateway node or mesh gateway node, and provides backhaul connectivity to a core network to the base stations 101, 102, and 103 over backhaul link 114 to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 1G, 5G, Wi-Fi etc. The base stations 101, 102, 103 may also be known as mesh network nodes 101, 102, 103.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network as described in, e.g., U.S. Pat. No. 5,491,801, hereby incorporated by reference in its entirety. As shown in FIG. 1, various user equipments 111a, 111b, 111c are connected to the base station 101. The base station 101 provides backhaul connectivity to the user equipments 111a, 111b, and 111c connected to it over mesh network links 106, 107, 108, 109, 110 and 114. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 1G, 5G, Wi-Fi, WiMAX, LTE, LTE-Advanced etc. supported by the mesh network base stations, and may interwork these technologies to IP.

Figure 2:
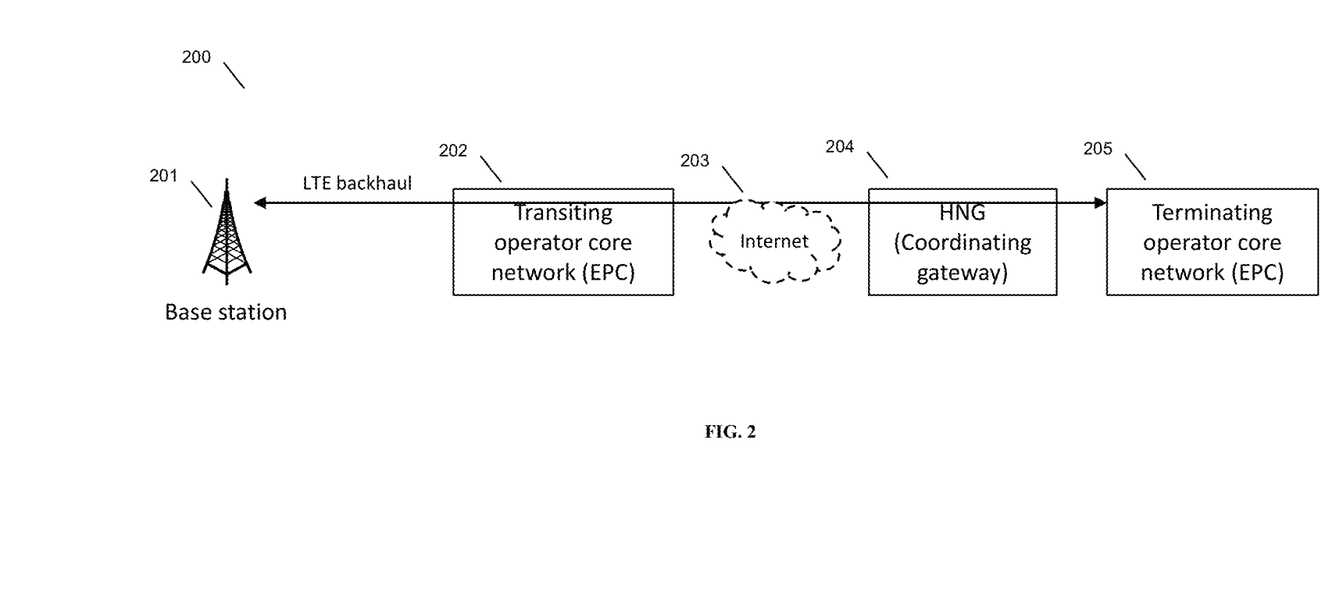
FIG. 2 is a diagram showing a bubble network architecture, in accordance with some embodiments.

FIG. 2 shows an architecture with a bubble network, with LTE backhaul for the bubble network transiting through a transiting operator core network 202. Base station 201 will attempt to connect to its own core network (and also via HNG 204 via Internet 203). When on LTE backhaul, underlying LTE transport network will result in an extra connection to an LTE core network. However, the terminating core network may not be the same as the transiting core network. This requires a tunnel through operator 1's network to get to operator 2's network. In some cases this may be difficult to configure.

A scenario occurs in which a bubble network has a connection to the remote core network, and that connection is disconnected. The inventors have contemplated a local core network that is able to fully support both connected and disconnected operation. Also, when a connection is reconnected, the present disclosure is able to allow the bubble network base station to rejoin the network.

In some embodiments, a loopback connection is used to provide a connection between a coordinating gateway and a local EPC at the local core network. Alternatives are contemplated, as described below. IPsec is used between base station and HNG, in some embodiments. Virtualized core networks (either core network 202 or 205) and virtualized gateways (204 included) are supported in some embodiments. Virtualization may be using containers or virtual machines, in some embodiments. IPs may be automatically configured or manually configured, in some embodiments.

A scenario is as follows. The mobile base station provides coverage extension to one or more users. The mobile station is backhauled by the LTE connection at the mobile base station (LTE backhaul), and this LTE backhaul connection is transiting through a core network of some operator, which may not be the same operator as the operator operating the mobile base station. The mobile base station attaches to an HNG node in the core network of the operator operating the mobile base station.

In some embodiments, a virtualized HNG and a virtualized EPC is provided at the base station location 201. The virtualized EPC provides a loopback connection for the virtualized HNG. A UE that connects to the base station is terminated by the virtualized HNG at the virtualized EPC, and traffic for the UE is forwarded by the HNG to the terminating operator core network 205.

In one embodiment, a virtualized EPC, which may have a Gi interface to the Internet, uses the Gi interface and/or a loopback connection at the local core network to connect back to the local HNG. The mobile LTE connection of the CWS (base station) is terminated as a loopback to the local HNG. This deployment may have the HNG at the base of the tower, in some embodiments.

In some embodiments, additional virtualized servers can be provided at the base station location 201. Examples include: HSS; AAA; PCRF; any other core network nodes required by the UE; higher-layer app servers such as web servers, web proxies, HTTP app servers; authentication servers; servers for connections that require authentication, usernames, passwords, keys; or other servers. These types of traffic may be terminated at the base station location 201 at a local virtualized server and backhauled via Gi interface by the HNG 204 acting as a proxy.

In some embodiments, when the bubble network loses its connection to the Internet, it may retain settings and configurations for the transiting core network, its own anchoring core network, or both. This enables the bubble network to reconnect to its anchoring core network as soon as the transiting backhaul is restored. In some embodiments this may enable reconnection to the anchoring core network when electrical power is lost and restored. The present disclosure has the advantage that even when backhaul is lost, termination at the local virtualized servers allows the UE to have some level of access.

In some embodiments, settings, state, parameters, UE state, etc. may be synced between HNGs whenever conductivity is available between HNGs. This allows the base station state to be consistently configured even when connectivity goes up and down. In particular, the HNGs can provision cell ID and eNBID, which determines the PCI of the cell. The HNGs can provision these independently of the remote core network and the transiting core network, which enables the base station to stably provide service even as the backhaul connection transits through one or another operator network.

In some cases, when backhaul comes back up, a process may be used to acquire, re-home, or reacquire remote network HNG 204. Network link state priority may be used, in some embodiments, to home onto the remote network HNG when it is available and fall back to a loopback network interface when the remote backhaul interface is not available.

The present disclosure could be used for connections to any app servers, usernames, passwords, HSS, any other node. Concept is to utilize the same app server (via loopback etc.) on the local network, not over the Internet (e.g., on the other side of the Gi interface). Manual configuration of the EPCs and HNGs is considered, in some embodiments.

Further, in a bubble network, where backhaul sometimes becomes available and is sometimes not available, it becomes necessary to enable changing link state priority, such that the local EPC is not always the EPC that is used, even when it is accessible. To illustrate this, the local EPC is always available via Ethernet, but it is not always the desired EPC. In some embodiments, a solution to this problem, storing a link state priority parameter, may be used, and this parameter may be used to utilize the remote network HNG and the remote network EPC when it is available.

In some embodiments, IPsec tunnels can be killed and reestablished as backhaul connections are brought up and brought down. In some embodiments, two tunnels may be established and both may be maintained, even when one tunnel is disconnected. In some embodiments, HNG-HNG communications may be encrypted via a separate tunnel, with the local HNG decrypting user equipment (UE) communications and forwarding them via an appropriate tunnel to the other HNG depending on the current connectivity state.

The present disclosure is considered for 2G, 3G, 4G/LTE, 5G standalone/nonstandalone, and other network architectures. The present disclosure provides a provisioning server for the base station that is independent of any particular radio access technology architecture and can be used for all of them. The present disclosure provides a core network virtualization node for the base station that is independent of any particular radio access technology architecture and can be used for all of them.

The inventors have contemplated the use of alternatives to a loopback interface, such as: cables, wires, memory sharing, virtual machine interfaces including hypervisors and inter-container connections, IP routing, buses, and other connections. Various alternatives and embodiments are also considered for virtualizing a network node, such as colocation, containers, virtual machines, etc.

Figure 3:
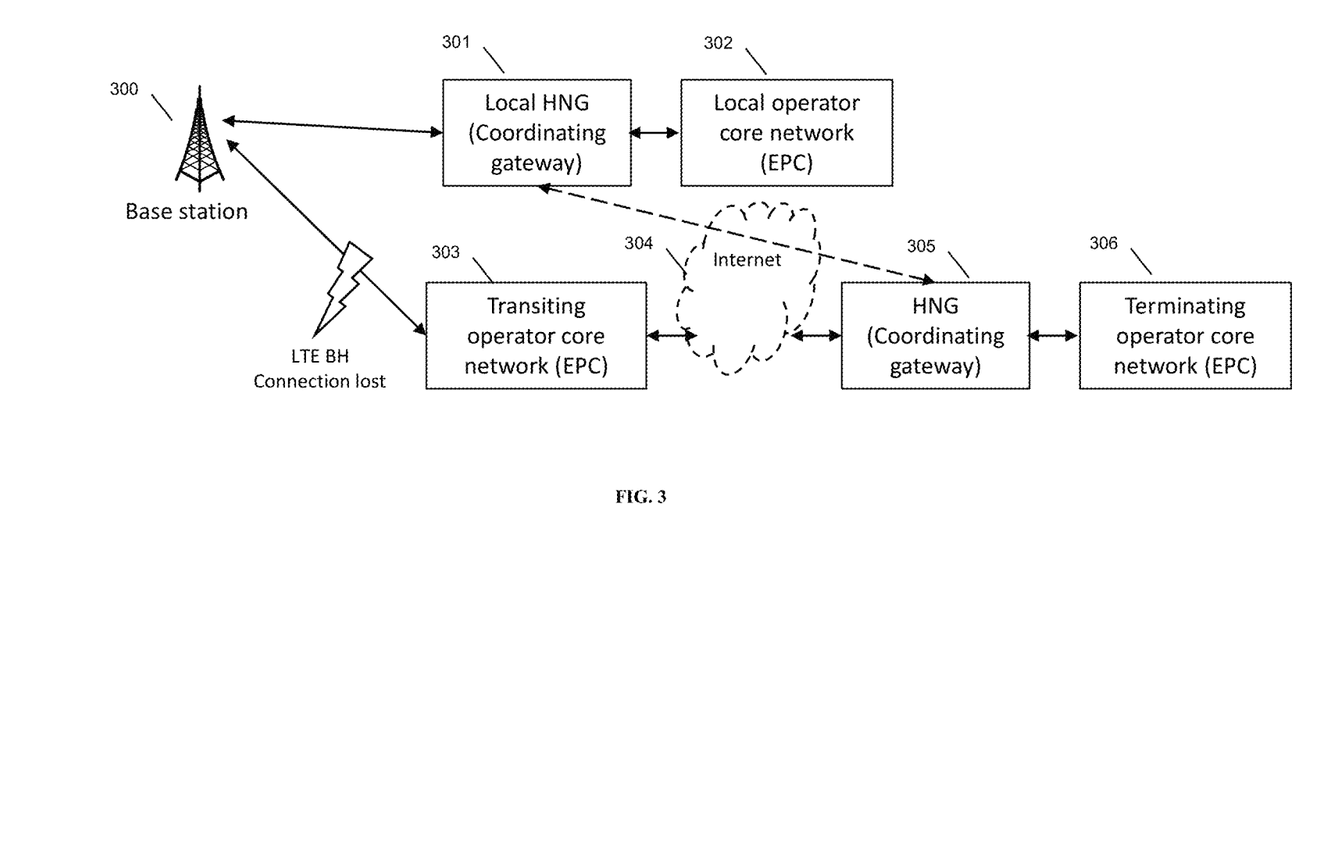
FIG. 3 is a diagram showing an architecture with a local EPC and loopback connection, in accordance with some embodiments.

FIG. 3 shows an architecture with a local HNG 301, local EPC 302 and loopback connection, in accordance with some embodiments. In a normal case, transiting operator core network 303, Internet 304, and HNG 305 are used to transit traffic to terminating operator core network 306. When backhaul (perhaps LTE) is cut between base station 300 and remote EPC 303, local HNG 301 takes over. When LTE backhaul is restored or if local HNG 301 can reach remote operator HNG 305, the two HNGs may swap roles, in some cases perform sync of settings and state. Local EPC is updated by local HNG based on sync. Remote EPC 303 is updated by remote HNG based on sync. UEs are anchored at the local EPC throughout. In some embodiments, the local HNG and EPC can be used prior to initial configuration of the backhaul or Internet connection.

IPsec encapsulation/deencapsulation is handled transparently by the pair of HNGs. In some embodiments, IPsec is enabled between base station 300 and the terminating core network 306. In some embodiments, when backhaul fails, IPsec is reenabled between base station 300 and local HNG 301; and when backhaul is reestablished, IPsec is reestablished between base station 300 and terminating core network 306. In some embodiments, two IPsec connections are maintained by base station 300, one with local HNG 301 and one with terminating core network 306, enabling quicker transitioning.

Regarding synchronization of the base station 300, HNG 301 and HNG 306 are configuration servers. The configuration servers may be kept in sync such that when the base station is acquired or reacquired by one of the HNGs, both HNGs are enabled to send a configuration that is the same as (in sync with) the configuration maintained at the other HNG. In some embodiments, automatic reprovisioning may be enabled, disabled, or able to be turned on and off based on configuration.

Figure 4:
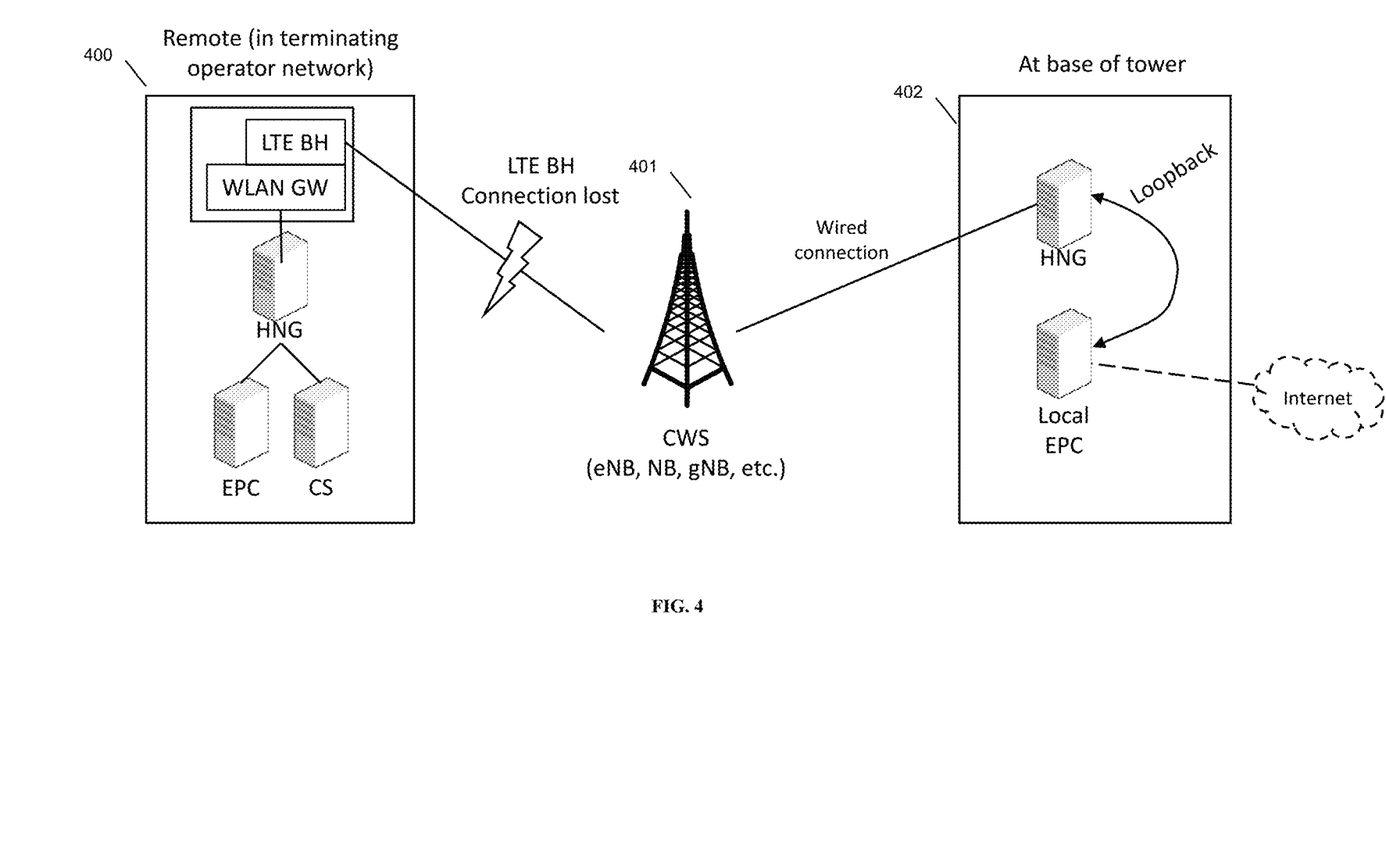
FIG. 4 is a diagram showing another architecture with a local EPC and loopback connection, in accordance with some embodiments.

FIG. 4 shows another depiction of another architecture with a local EPC and loopback connection, in accordance with some embodiments. CWS 401 (base station) is anchored at remote EPC and remote HNG. When the LTE backhaul is lost, CWS 401 will attempt to connect to a local HNG and local EPC at base of tower 402. The local EPC can be colocated with the HNG and the local EPC and local HNG can be configured to connect to each other over the loopback interface, thereby enabling simpler configuration. Loopback can be presented to the CWS as another virtual LTE BH connection. Local EPC and local HNG at base of tower 402 will sync with the remote HNG and remote EPC 400 when available. Internet may or may not be available; when available, local EPC/local HNG can use to connect to remote operator network nodes. When reconnected, the local EPC/local HNG may inform the remote EPC and/or remote HNG that it is reconnected. In some embodiments, remote HNG can maintain the connection to remote EPC active even when disconnected. In some embodiments, backhaul may consist of an Internet connection (in some cases the Gi interface), via LTE backhaul and/or a WLAN gateway or security gateway into a coordinating server/HNG at the remote operator network 400.

Figure 5:
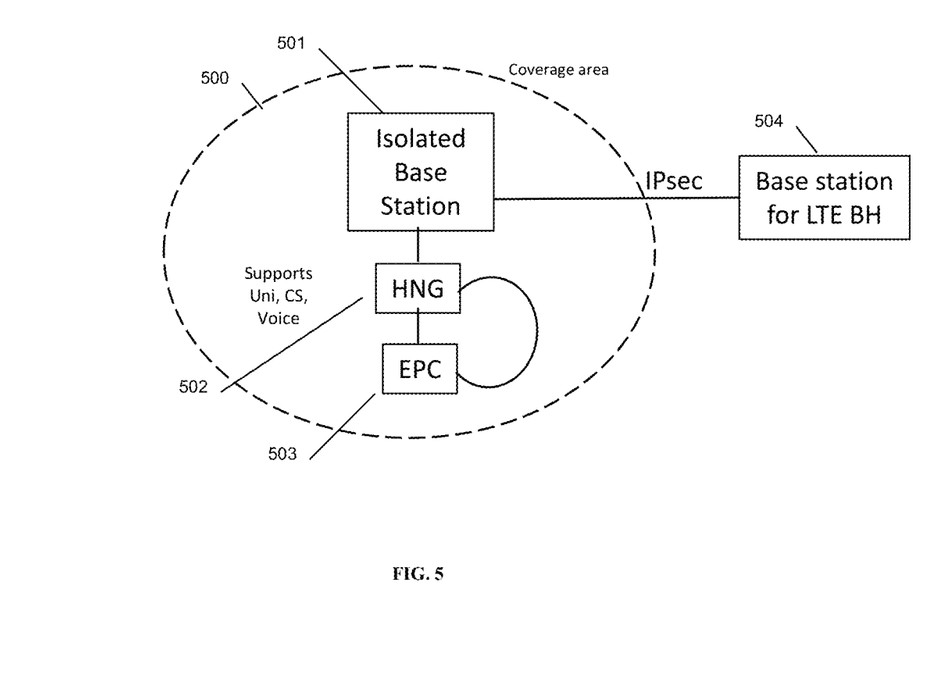
FIG. 5 is a diagram showing a virtualized HSS that is being used at the remote site where the mobile base station is, in accordance with some embodiments.

FIG. 5 shows a virtualized HSS that is being used at the remote site where the mobile base station is, in accordance with some embodiments. An isolated base station 501 is in communication with a remote core network (not shown). The base station 501 has coverage area 500, and within the coverage area are loopback HNG 502 and loopback EPC 503. Base station 501 is in communication with base station 504 providing LTE backhaul via an IPsec connection extending beyond the coverage area 500. When backhaul is not available, base station 501 is isolated, and uses HNG 502 and EPC 503. HNG 502 is connected via a loopback interface with EPC 503, in some embodiments, as they are colocated on a single server using virtual machines. In other embodiments, in the case they are colocated but not on the same physical server, HNG 502 and EPC 503 may be coupled with each other and with isolated base station 501 with Ethernet, fiber, Fibre Channel, CPRI, or any other combination of wired interfaces as appropriate.

Figure 6:
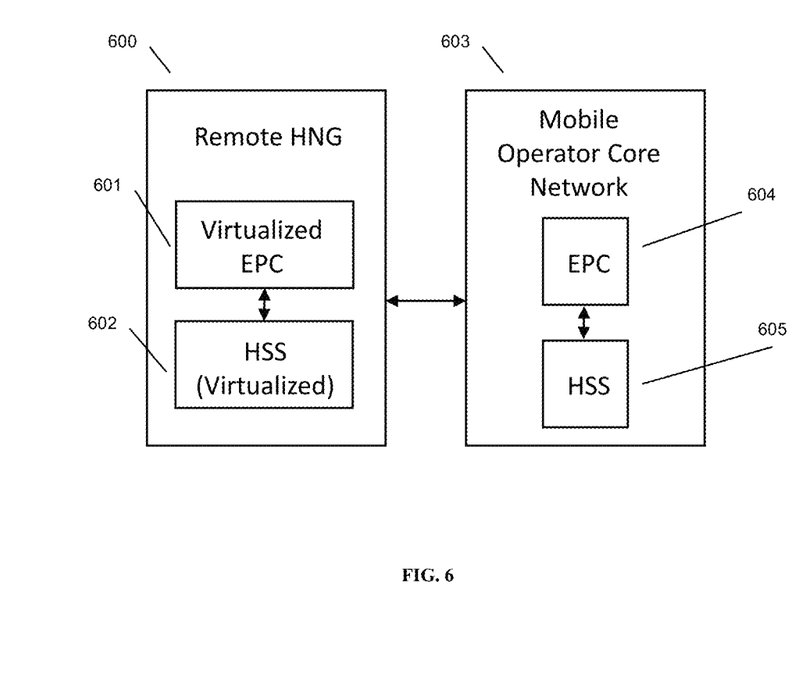
FIG. 6 is diagram showing a remote HNG and a mobile operator core network, in accordance with some embodiments.

FIG. 6 shows a remote HNG 600 including a virtualized EPC 601 and a virtualized HSS 602, in accordance with some embodiments. Also shown is a mobile operator core network 603 including an EPC 604 and an HSS 605. The remote HNG is located near the base station and in some embodiments colocated with the base station. The remote HNG hosts both the virtualized EPC 601 and virtualized HSS 602, in the embodiment shown, and is in communication with mobile operator core network 603. Sync and/or caching are provided to enable the virtualized nodes 601 and 602 to maintain current data and to enable proper functioning in the case that the backhaul connection to the operator core network 603 is lost.

Figure 7:
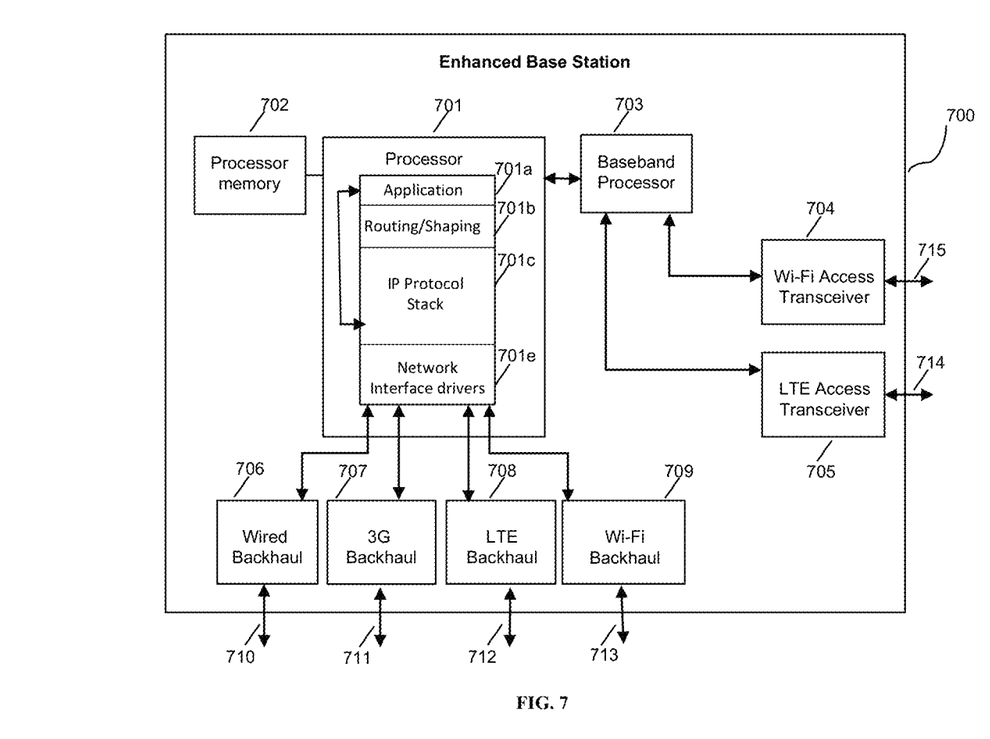
FIG. 7 is a diagram of an enhanced eNodeB for performing the methods described herein, in accordance with some embodiments.

FIG. 7 is a schematic diagram of an enhanced eNodeB, in accordance with some embodiments. Enhanced eNodeB 700 may include processor 701, processor memory 702 in communication with the processor, baseband processor 703. Enhanced eNodeB 700 may also include Wi-Fi access transceiver 704 with access side interface 715, and LTE access transceiver 705 with access side interface 714 and thereby connecting to user equipments (not shown in the figure). Enhanced eNodeB 700 may also include wired backhaul 706 with wired backhaul interface 710, 3G backhaul 707 with 3G backhaul interface 711, LTE backhaul 708 with LTE backhaul interface 712, and Wi-Fi backhaul 709 with Wi-Fi backhaul interface 713. Enhanced eNodeB provides backhaul connectivity via backhaul interfaces 710, 711, 712, and 713 to user equipments connected to the enhanced eNodeB via access interfaces 714 and 715. As shown in the FIG. 7, LTE access transceiver 705 and Wi-Fi access transceiver are further in communication with baseband processor 703 that is also in communication with processor 701.

Processor 701 and baseband processor 703 are in communication with one another. Processor 701 may perform routing functions, and may determine if/when a switch in network configuration is needed. Baseband processor 703 may generate and receive radio signals for both wi-fi access transceiver 704 and LTE access transceiver 705, based on instructions from processor 701. In some embodiments, processors 701 and baseband processor 703 may be on the same physical logic board. In other embodiments, they may be on separate logic boards.

The LTE access transceiver 705 may be a radio transceiver capable of providing LTE eNodeB functionality, and may be capable of higher power and multi-channel OFDMA. The LTE backhaul 708 may be a radio transceiver capable of providing LTE UE functionality. Both 705 and 708 are capable of receiving and transmitting on one or more LTE bands. In some embodiments, either or both of transceivers 705 and 708 may be capable of providing both LTE eNodeB and LTE UE functionality. Transceivers 705 and 708 may be coupled to processor 701 via baseband processor 703. In addition, wired backhaul 706 coupled to processor 701 may provide backhaul connectivity to other 3G femto base station via wired Ethernet interface 710. 3G backhaul 707 coupled to processor may provide 3G wireless backhaul connectivity.

Wired backhaul 706, or wireless backhaul 709, or any combination of backhaul, may be used. Wired backhaul 706 may be an Ethernet-based backhaul (including Gigabit Ethernet), or a fiber-optic backhaul connection, or a cable-based backhaul connection, in some embodiments. Additionally, wireless backhaul 709 may be provided in addition to 3G backhaul 707 and LTE backhaul 708, which may be Wi-Fi 702.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 701 may identify the appropriate network configuration and may perform execute instructions stored in processor memory 702 for admission control, application layer processing 701a, routing and shaping 701b of packets from one network interface to another accordingly. Processor 701 manages internal policy state and monitoring, determines local congestion, and communicates with the coordinating node. Processor 701 may use memory 702, in particular to store a routing table to be used for routing packets. Baseband processor 703 may perform operations to generate the radio frequency signals for transmission or retransmission by transceivers such as 704, 705, 707, 708, 709. Baseband processor 703 may also perform operations to decode signals received by transceivers 704, 705, 707, 708, 709. Baseband processor 706 may use memory 702 to perform these tasks. Further, processor 701 may perform tagging at tagger 701d that may be part of IP protocol functionality 701c in communication with application layer 701a. Network interface drivers 701e may send and receive messages over backhaul interfaces 710, 711, 712, 713 via 706, 707, 708, 709 respectively.

In operation, packets may be received from access transceivers 704, 705 and may be processed by processor 701 to determine what type of tagging is required. The packets may be tagged by tagger 701d in conjunction with program logic in application 701a, which identifies the type of traffic. Prioritization is performed at routing/shaping layer 701b, which issues instructions to IP protocol stack 701c to enqueue packets for the backhaul link(s), and the queued packets are sent out via network interface driver 701e to backhaul interfaces 706, 707, 708, 709. Admission control is handled at application level 701a (the RAN PHY is the application in this case).

Figure 8:
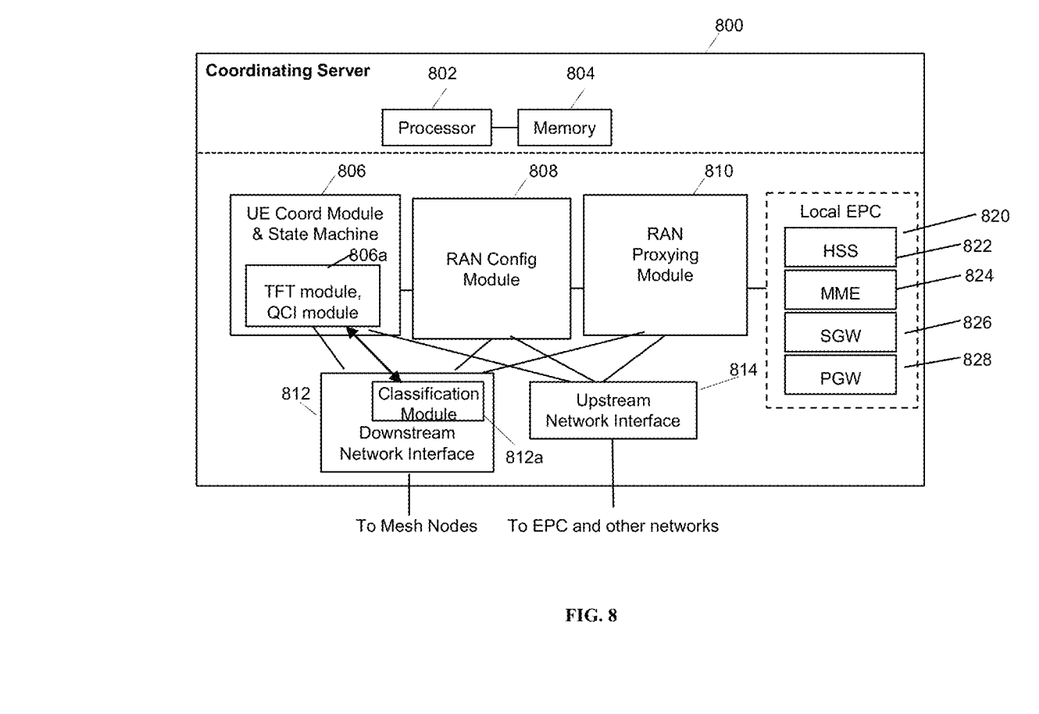
FIG. 8 is a diagram of a coordinating server for providing services and performing methods as described herein, in accordance with some embodiments.

FIG. 8 is a schematic diagram of a coordinating node, in accordance with some embodiments. The coordinating node may also be known as coordinating server in this disclosure. Coordinating node 800 includes processor 802 and memory 804, which are configured to provide the functions described herein. Also present are UE coordination module and state machine 806, RAN configuration module 808, and RAN proxying 810. UE coordination module 806, and in particular TFT module/QCI module 806a, may perform the functions described herein for QOS management and admission control, including estimating bandwidth, determining congestion, and classifying bearers in conjunction with classification module 812a. RAN configuration module 808 may coordinate installed admission control policies across the network (e.g., at eNodeBs), may keep track of which policies have been sent to which nodes in the mesh and may also send policies to the nodes. RAN configuration module 808 is aware of which node is the backhaul egress node (or nodes). In some embodiments, coordination server may also provide proxying, routing virtualization and RAN virtualization, via module 810. In some embodiments, a downstream network interface 812 is provided for interfacing with the RANs, which may be a radio interface (e.g., LTE), and an upstream network interface 814 is provided for interfacing with the core network, which may be either a radio interface (e.g., LTE) or a wired interface (e.g., Ethernet). Downstream network interface 812 may further include classification module 812a in communication with TFT module/QCI module 806a. Classification module 812a may perform classification of traffic before sending messages to mesh nodes in the downstream direction. Signaling storm reduction functions may be performed in module 806. The coordinating node may be located in the network as shown in FIG. 1 as signaling coordinator 105.

Coordinating node 800 includes local evolved packet core (EPC) module 820, for authenticating users, storing and caching priority profile information, and performing other EPC-dependent functions when no backhaul link is available. Local EPC 820 may include local HSS 822, local MME 824, local SGW 826, and local PGW 828, as well as other modules. Local EPC 820 may incorporate these modules as software modules, processes, or containers. Local EPC 820 may alternatively incorporate these modules as a small number of monolithic software processes. Modules 806, 808, 810 and local EPC 820 may each run on processor 802 or on another processor, or may be located within another device.

In some embodiments, the gateway of FIG. 8 may be a virtualized radio access network or may provide virtual network functions (VNFs). For example, the gateway of FIG. 8 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. The latency characteristics of the global scheduler described herein are flexible, as it is possible to provide helpful hints and hash keys for resources even with latencies of tens or hundreds of milliseconds. Therefore, the flexibility of a virtualized global scheduler is greater than that of a convention cloud radio access network (CRAN) infrastructure.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. Further, the computer readable medium could be distributed across memory storage devices within multiple servers, multi-RAT nodes, controllers, computing cloud components, mobile nodes, and the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology. Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNodeBs or gNBs), or base stations that provide multi-RAT access in a single device, depending on context.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)—associated radio frequency bands. In some embodiments, the base stations described herein may also support more than one of the above radio frequency protocols, and may also support transmit power adjustments for some or all of the radio frequency protocols supported.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A system for providing a mobile base station bubble network, comprising:
    an isolated base station wherein backhaul is not available, the isolated base station having a coverage area and providing services to a group of localized users;
    a local HetNet Gateway (HNG) disposed within the coverage area and in communication with the isolated base station;
    a local Evolved Packet Core (EPC) in communication with the local HNG and disposed within the coverage area;
    wherein the bubble network is disconnected from a mobile operator core network; and
    wherein the local HNG synchronizes with a remote HNG when a connection between the local HNG and remote HNG is available; and
    a loopback from the local EPC to the local HNG.

2. The system of claim 1 wherein the local EPC synchronizes with a remote EPC when the connection between the local HNG and remote HNG is available.

3. The system of claim 2 wherein the connection is an Internet Protocol Security (IPsec) connection.

4. The system of claim 1 wherein the network is at least one of 2G, 3G, 4G/LTE, 5G standalone/nonstandalone network.

5. A method providing a mobile base station bubble network, comprising:
    providing an isolated base station wherein backhaul is not available, the isolated base station having a coverage area and providing services to a group of localized users;
    providing a local HetNet Gateway (HNG) disposed within the coverage area and in communication with the isolated base station;
    providing a local Evolved Packet Core (EPC) in communication with the local HNG and disposed within the coverage area;
    wherein the bubble network is disconnected from a mobile operator core network;
    synchronizing the local HNG with a remote HNG when a connection between the local HNG and remote HNG is available;
    providing a loopback from the local EPC to the local HNG.

6. The method of claim 5 further comprising synchronizing the local EPC with a remote EPC when the connection between the local HNG and remote HNG is available.

7. The method of claim 6 wherein the connection is an Internet Protocol Security (IPsec) connection.

8. The method of claim 5 wherein the network is at least one of 2G, 3G, 4G/LTE, 5G standalone/nonstandalone network.

9. A non-transitory computer-readable medium containing instructions for a mobile base station bubble network which, when executed, cause a system to perform steps comprising:
    operating an isolated base station wherein backhaul is not available, the isolated base station having a coverage area and providing services to a group of localized users;
    operating a local HetNet Gateway (HNG) disposed within the coverage area and in communication with the isolated base station;
    operating a local Evolved Packet Core (EPC) in communication with the local HNG and disposed within the coverage area;
    wherein the bubble network is disconnected from a mobile operator core network; synchronizing the local HNG with a remote HNG when a connection between the local HNG and remote HNG is available; and
    operating a loopback from the local EPC to the local HNG.

10. The computer-readable medium of claim 9 further comprising instructions for synchronizing the local EPC with a remote EPC when a connection between the local HNG and remote HNG is available.

11. The computer-readable medium of claim 10 further comprising instructions wherein the connection is an Internet Protocol Security (IPsec) connection.

12. The computer-readable medium of claim 9 further comprising instructions wherein the network is at least one of 2G, 3G, 4G/LTE, 5G standalone/nonstandalone network.

* * * * *